July 12, 1966 A. H. DRAIN 3,260,129
ADJUSTABLE CAM PROGRAMMER
Filed April 23, 1964 2 Sheets-Sheet 1

INVENTOR
Alfred H. Drain
*Hogan, Leonard & Bulf*
his attorneys

July 12, 1966  A. H. DRAIN  3,260,129
ADJUSTABLE CAM PROGRAMMER
Filed April 23, 1964  2 Sheets-Sheet 2

INVENTOR
Alfred H. Drain

United States Patent Office 3,260,129
Patented July 12, 1966

3,260,129
ADJUSTABLE CAM PROGRAMMER
Alfred H. Drain, Richland Township, Allegheny County, Pa., assignor to Heppenstall Company, Pittsburgh, Pa., a corporation of Pennsylvania
Filed Apr. 23, 1964, Ser. No. 362,002
12 Claims. (Cl. 74—568)

This invention relates to an adjustable cam programmer adapted to operate one or more cam followers in the couse of a cycle of operations and in accordance with an input force imposed upon the programmer. More particularly, this invention pertains to a programming device having input and output portions which may be mounted together on an instrument panel and in which the output portion is adjustable and may utilize a clutch connection between the cam and gear means and ring cams for ready shifting or change of program, for proximate actuation of a plurality of program response elements such as microswitches.

In the programming of controls for machine tools, industrial furnace doors and other cycle or sequential operation equipment, it often is undesirable to have program control elements, such as limit switches for example, mounted thereon. In the case of machines, they are subject to being covered or interfered with by chips or particles from the work being machined, or tooled, or to be flooded by coolant, or otherwise effected as in the case of magnetic fluxes which occur around machines having magnetic chucks. With such furnace doors, limit switches thereon or adjacent thereto can be adversely affected by heat, dirt and/or scale. Moreover, such directly mounted programming elements often have to be located in positions to which access is not easy, tending to interfere with the accuracy of any change that is to be made and/or requiring a relatively long set-up time for a new program, as well as increasing the chances that a switch or other program element part may easily get out of order or adjustment.

The foregoing difficulties and deficiencies are overcome by the use of embodiments of this invention. Therein, programming elements may be mounted away from the machine tool or other equipment to be controlled. And, such mounting preferably is in a selected location of small area, as in the case of mounting on a panel or portion thereof. Further, a plurality of program events can be accommodated for setting and resetting by a single operator either using cam means useful in a prior program cycle, or by the replacement of such cam means where there is different requirement for the particular program element, without affecting the adjustability and/or selection of the number of events which may be caused to occur in one cycle as against the next.

Other objects, features and advantages of this invention will be apparent from the following description and the accompanying drawings, which are illustrative only, in which FIGURE 1 is a view in front elevation of a portion of an instrument or console panel having one embodiment of this invention mounted thereon;

Figure 3:
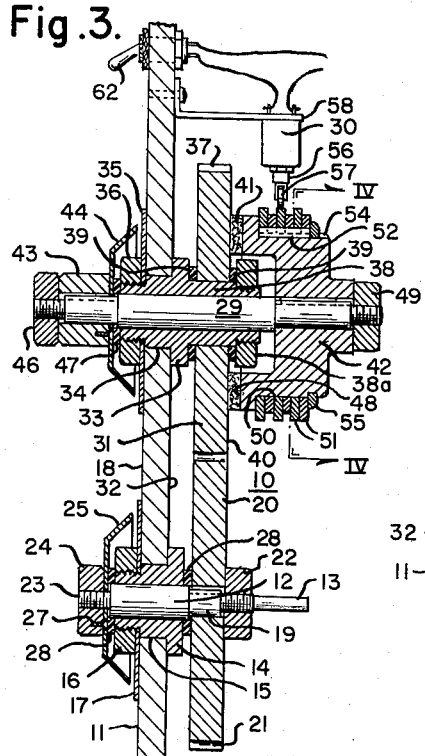
FIGURE 3 is a view in section taken along line III—III of FIGURE 2.

Referring to FIGURES 1 to 4, inclusive, one embodiment 10 of this invention is shown mounted upon an instrument or console panel 11 for use in a programming cycle in which, irrespective of the over-all time taken, a series of program events is caused to occur in correspondence with a rotational input imposed upon an input shaft 12 by a principal drive element. Such principal drive element, not shown, may be a connection to a crankshaft, or to a speed reducer connected to the drive for a machine tool to be controlled, or to a Selsyn servomechanism responsive to the fundamental distance factor in a programming cycle for the occurrence of respective events, usually non-simultaneous. Input shaft 12 is mounted in a bushing 14 which fits in an opening 15 in panel 11. Bushing 14 is fixed in place by a nut 16 engaging the threaded front end of the bushing. An annular calibrated input dial 17 is fixed to the front 18 of the panel by the same nut 16, the center opening of dial 17 fitting over the threaded portion of bushing 14. Shaft 12 is provided with a neck 19 which fits the central opening of an embodiment drive gear 20 having peripheral teeth 21 over the full width of the gear between the front and back faces thereof, such teeth being spur teeth as shown, although other types may be used. Gear 20 is keyed to shaft 12 and held in axial position thereon by a nut 22 which engages an inner threaded portion of shaft 12.

The front end of shaft 12 is threaded at 23 and engaged by a knob 24 having a register flange 25 thereon bearing an index mark 26 to cooperate with markings on dial 17. Both dial 17 and flange 25 may be marked in angular degrees, or with such other calibrations or scorings as may be desired for a particular programming service. As shown, dial 17 preferably is marked in terms of 360 individual degrees, or aliquot parts of the whole. Flange 25 is fastened to the underside of knob 24 by one or more flush headed screws 27. Thrust members 28 which may be roller thrust bearings, or a nylon thrust washer, as desired, are abutted by the underside of knob 24 and the forward face of gear 20 to permit rotation of shaft 12, the gear 20 and knob 24 relative to bushing 14 and dial 17 in correspondence with and when the inner end 13 of shaft 12 is turned by the program cycle master rotational force. Normally, no adjustment of the portion of the apparatus just described is required once knob 24 with its flange 25 are placed in the desired initial indexing position relative to dial 17. In present day controls for machine tools and other equipment, starting and stopping are so precise that, in the case of the illustrated embodiment, in the initial starting position with index symbol 26 opposite "0" on dial 17, a new cycle of operation will commence and end after a rotation of 360° of input shaft 12, symbol 26 coming back to and stopping on such "0"; or, a program cycle may be some part of a full revolution of 360°.

Preferably cooperating with the input portion of embodiment 10 is an output portion also shown in such FIGURES 1 to 4, inclusive. In such output portion, a single output shaft 29 is used for actuating a plurality of programming events or elements using a plurality of microswitches 30 arranged in an arc around a driven gear 31 on the rear side 32 of panel 11. Shaft 29 is journaled in a bushing 33 which is fixed in place and extends through an opening 34 in such panel. An output dial 35 is reld in position by a nut 36 engaging a forward threaded portion of bushing 33. Driven gear 31 has peripheral teeth 37 in mesh at all times with teeth 21 on gear 20 and is free to rotate on an arbor portion 38 of bushing 33 between roller thrust bearings, or nylon thrust washers, 39, held by a nut 38a. An anti-backlash spring may also be present around arbor 38 against gear 31. Such teeth 37 extend for the full thickness of gear 31 and an annular portion of the rear face 40 of gear 31 comprises a clutch surface wrich is adapted to be engaged by an annular ring 41 of clutch facing material, the rearward side of which is fastened to cam holder 42.

The front end of shaft 29 extends forwardly through bushings 33 and is keyed to a knob 43 having a register flange 44 with an index symbol 45 thereon to indicate angular movement of output shaft 29 and the respective cams thereon relative to the respective angular positions of program switches 30, when cam holder 42 is in clutched connection to driven gear 31. Such clutching or connecting means are engaged by the tightening of a nut 46 in threaded engagement with the front end of output shaft 29. When making the clutched connection knob 43 is caused to press against a thrust member 47, which may be a roller thrust bearing or a nylon thrust washer, thereby pulling shaft 29 and cam holder 42 into clutched engagement with gear 31, causing the cam holder 42 to turn through the clutch facing 41. Conversely, the loosening of tightening member 46 declutches shaft 29 and holder 42 so that they will not turn in correspondence despite any turning of driven gear 31. The angular position of cam holder 42 is fixed on output shaft 29 by being keyed thereto, the holder being held between a shoulder on that shaft and a lock nut 49. Although the input portion of device 10 is shown with but one output shaft 29 having a plurality of program elements associated therewith, it will be understood that one or more other driven output gears, with their own respective program elements associated therewith, may be operated from the common drive gear 20 and input shaft 12, if desired.

Figure 2:
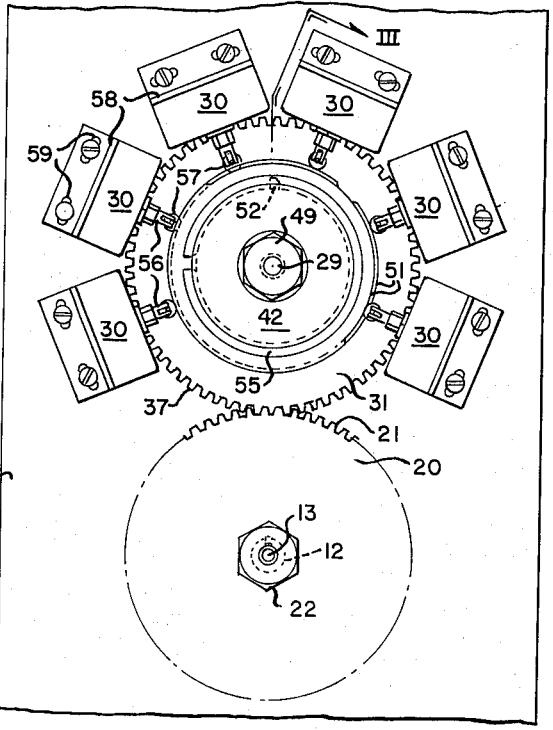
FIGURE 2 is a view in rear elevation of such embodiment so mounted.

Cam holder 42 is provided with a cylindrical surface 50 to hold firmly a plurality of cam rings 51, side-by-side, in respective and selected angularly oriented position by means of a key 52 engaging both a key recess 53 in the respective cam rings and an axially extending key recess 54 in surface 50 of holder 42. A snap ring 55 cooperates with a peripheral recess in surface 50 to lock the cams 51 and key 52 in place. In the illustrated embodiment, each cam ring cooperates with one of the plurality of microswitches 30 arranged in arcuate fashion as shown in FIGURE 2. Each microswitch is provided with a pin 56 and cam roller 57 to run on the peripheral surface of its respective cam 51. Such a microswitch requires very small movement of pin 56 for the actuation thereof. Each microswitch is secured to the back of panel 11 by a bracket 58, the length of which varies so that each cam roller 57 of the six shown is on the periphery of a different one of the six cams 51 shown. If desired, more than one switch may be operated from the periphery of one cam. Slots 59 in the panel end of the brackets 58 enable the position of each respective switch to be indexed with precision relative to the camming configuration of its respective cam 51.

Figure 1:
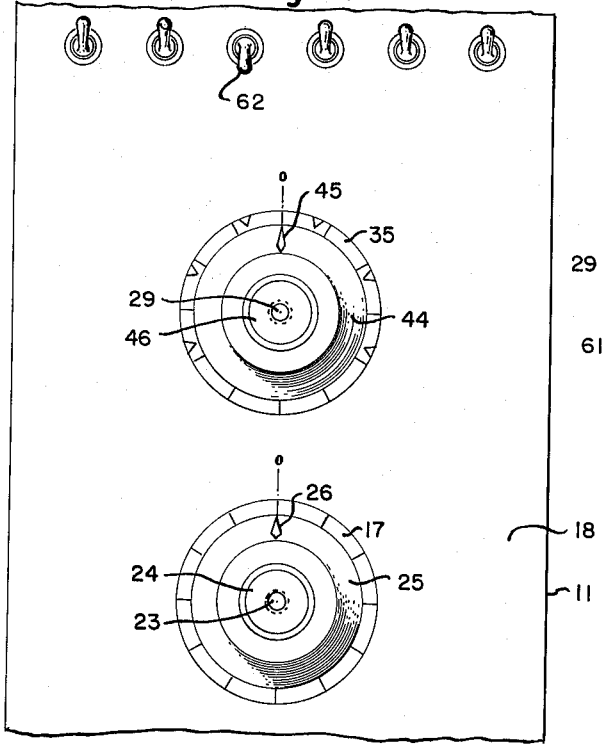
Figure 4:
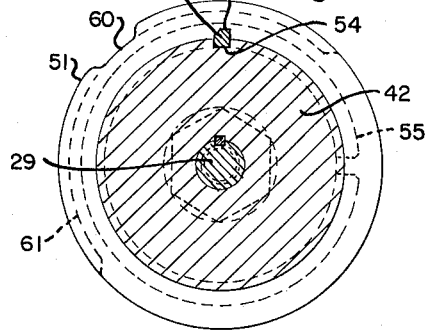
FIGURE 4 is a view partly in section taken along line IV—IV of FIGURE 3.

The switch 30 which has its cam follower 57 riding on the periphery of the cam 51 shown in FIGURE 4 in full line outline will respond to the cam fall portion 60 when the two meet in the course of a revolution of driven gear 31 in clutched connection with holder 42 and shaft 29. Similarly, in the case of the remaining cam as shown in FIGURE 4 toward snap ring 55, its switch roller 57 will respond to the cam fall portion 61, and/or remaining rise portion of the periprery, as selected and when they meet in the course of the same revolution of gear 31. The other cams 51 may have the same or different cam rises and fall portions, or dwells, as called for by the respective program cycle being operated at the time being. As shown in FIGURE 1, dial 35 may have the respective positions of the rollers 57 indicated thereon. In operation, when a succeeding program cycle requires a different length of time of any acutation of switch 30, or a different beginning and/or ending time of such actuation, a corresponding new cam ring therefore can readily be substituted and moved into position by taking off snap ring 55 and sliding the rings 51 nearer to nut 49 off surface 50, so that the new ring may be slid on into position and the others replaced, before ring 55 is replaced to lock the new subassembly together. Moreover, the angular orientation in the output portion of device 10 can be changed in respect of cam holder 42 as a whole by loosening tightener 46 and rotating knob 43 in the desired direction and to the desired angular extent for the next program cycle without in any wise changing the angular position of driven gear 31, whereupon the retightening of nut 46 moves holder 42 back into clutched relation with gear 31 so that thereafter the two will move together in the course of the performance of the next program. Or, cam rings 51 may be provided with a plurality of key recesses 53 around the inner periphery thereof for individual angular adjustment of such a cam ring 51 without changing the angular position of holder 42 or the other cams 51. Still further, if all switches are used in one program cycle, but one or more is not needed in the next, the respective toggle switch or switches 62 mounted on panel 11 can be moved from "On" to "Off" position and, being electrically interconnected with the respective switch or switches 30, will eliminate that switch or switches from such next program operation.

Figure 5:
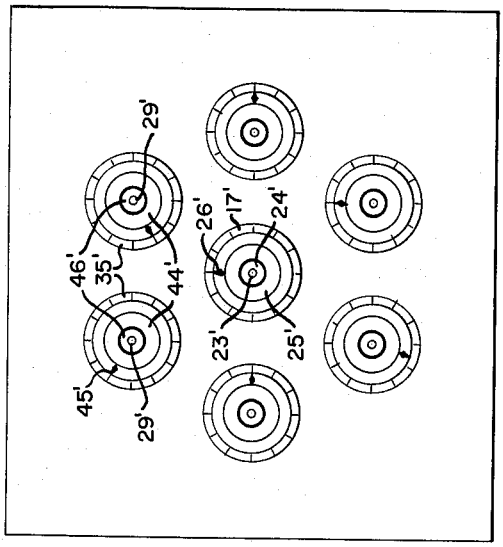
FIGURE 5 is a view in front elevation of a further embodiment of this invention mounted on a panel.
Figure 6:
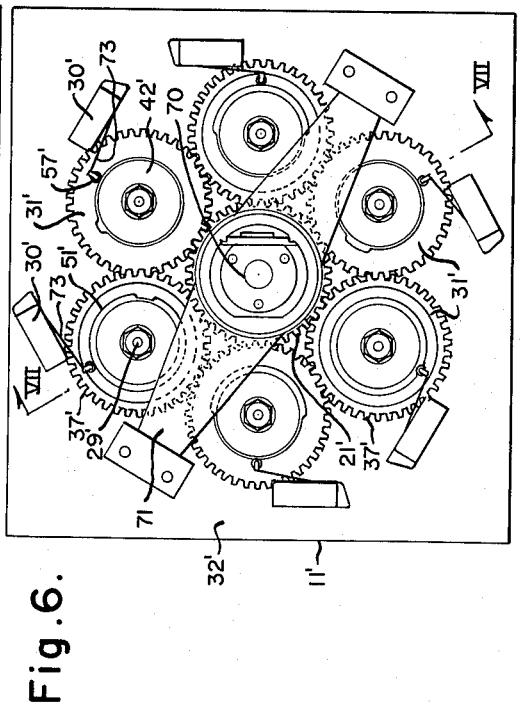
FIGURE 6 is a view in rear elevation of such further embodiment so mounted.
Figure 7:
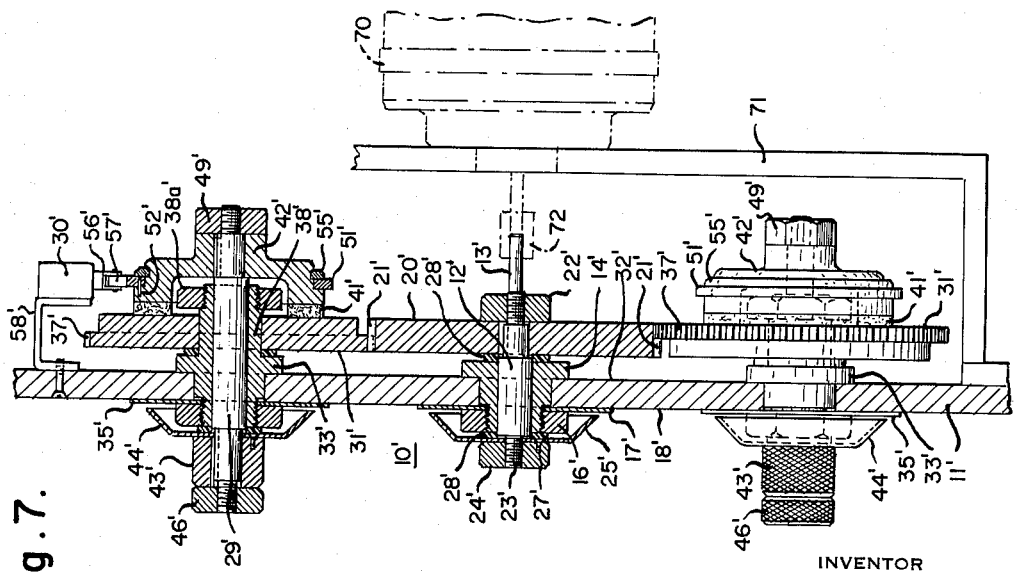
FIGURE 7 is a view in section taken along line VII—VII of FIGURE 6.

In the further embodiment illustrated in FIGURES 5 to 7, inclusive, parts corresponding generally in structure and infunctioning to parts in the above first-described embodiment 10 are marked herein with the same reference numerals with the addition of a prime accent thereto, respectively. Thus, in modification 10', a Selsyn motor 70 is shown in chain outline mounted on a support 71 fixed to the back of panel 11' to provide the desired input rotation through a coupling 72 to the input end 13' of input shaft 12'. Drive gear 20', however, is in mesh with a circle of driven gears 31', the pitch circles of such driven gears being in tangential relation to the pitch circle of gear 20' and of the respectively adjoining gears 31'. In that way, one may provide for a maximum number of driven gears in mesh with a single drive gear and, further, provide for a highly convenient 1:1 gear ratio where such is needed, or desired. On the other hand, other ratios may be utilized, if desired. Interference by the peripheral teeth 37' of the respective driven gears is avoided, since each driven gear is turned in the same direction by gear 20', by having such teeth 37' extend over slightly less than one-half of the thickness of the gear toward its thickness center between its faces and by alternating the position of such peripheral teeth 37' on adjoining driven gears 31'. Hence, all of the driven gears are always in mesh with the drive gear 20' but not in mesh with each other because of the staggering of the peripheral teeth 37', being on the outer half of a driven gear 31' in one position, on the inner half of the driven gear 31' in the next position and so on in the respective circle of driven gears 31'. Under these circumstances, each cam holder 42', in the illustrated further embodiment, carries but a single cam ring 51' which is oriented in angular position relative to holder 42' by a pin 52' which extends into an axial hole through the cam ring and into a corresponding hole in the forward shoulder of holder 42', a snap ring 55' being used to keep the subassembly together. Each of the microswitches 30' in embodiment 10' can be spaced the same distance away from panel 11' as its cam roller 57' rides on the periphery of its respective cam 51'. A spring lever 73 is utilized between each cam roller 57' and the pin of each switch 30' in such further embodiment. If desired for still further flexibility and adjustability of operation, a series of holes for a pin 52' may be drilled around the body of each cam ring 51' for further orientation adjustment thereof relative to its respective holder 42', in addition to and beyond the adjustability of each holder 42' when declutched from its driven gear 32' by its knob 43' and nut 46'. Any declutched holder 42', its shaft 29' and cam 51' can remain deactivated by leaving its nut 46' loosened.

It will be seen, therefore, that a large number of program elements may be provided by this invention for a single input force, that such program elements are readily subject to reorientation and/or adjustment for the needs of any program, or any change to be incorporated in a succeeding program. Moreover, all of such programming can be handled, if desired, away from the machine or other equipment to be operated in accordance with such program or programs, with relatively greater precision, celerity and lower labor cost. Various changes may be made in details of the illustrated embodiments and other embodiments provided without departing from the spirit of this invention or the scope of the appended claims.

What is claimed is:

1. An adjustable cam programmer, apparatus comprising, in combination, a panel, an input shaft, a bushing mounted on said panel, said shaft extending through said bushing and panel, a drive gear having peripheral teeth and keyed to said shaft behind said panel, a dial fixed to the front of said panel surrounding said shaft, a knob secured to said shaft in front of said panel, said knob having an index symbol to indicate the angular position of said shaft relative to said dial, at least one output shaft parallel to said input shaft, a second bushing mounted on said panel, said output shaft extending through said second bushing and panel, a cam holder keyed to said output shaft behind said panel, a driven gear having peripheral teeth in mesh with the teeth of said drive gear, said driven gear being freely mounted on an arbor portion of said second bushing, said cam holder being mounted for rotation with said output shaft when in clutched connection with said driven gear, a second dial fixed to the front of said panel surrounding said output shaft, a knob secured to said output shaft in front of said panel and having an index mark to indicate the angular position of said output shaft relative to said second dial, a tightening member connected to the front portion of said output shaft and adapted to place said cam holder in clutched connection with said driven gear when said tightening member is tightened, a clutch facing positioned between said cam holder and driven gear, a plurality of cam rings mounted on the periphery of said cam holder in selected angular positions respectively a plurality of arcuately arranged microswitches having cam followers extending toward a respective one of said cam rings in the plane thereof, and electrical means for deactivating any selected switch or switches not needed in a particular programming operation.

2. In an adjustable cam programmer, apparatus comprising, in combination, a panel, an input shaft, a bushing mounted on said panel, said shaft extending through said bushing and panel, a drive gear having peripheral teeth and keyed to said shaft behind said panel, means to indicate the relative angular position of said shaft, at least one output shaft, a second bushing mounted on said panel, said output shaft extending through said second bushing and panel, a cam holder keyed to said output shaft behind said panel, a driven gear having peripheral teeth in mesh with the teeth of said drive gear, said cam holder being mounted for rotation with said output shaft when in clutched connection with said driven gear, a second means to indicate the relative angular position of said output shaft, a tightening member connected to the front portion of said output shaft and adapted to place said cam holder in clutched connection with said driven gear when said tightening member is tightened, a plurality of cams mounted on the periphery of said cam holder in selected angular positions respectively, a plurality of arcuately arranged response elements having cam followers extending toward a respective one of said cams, and means for deactivating any selected response element or elements not needed in a particular programming operation.

3. In an adjustable cam programmer, apparatus comprising in combination, a panel, an input shaft, a drive gear having peripheral teeth and keyed to said shaft behind said panel, means to indicate the relative angular position of said shaft, at least one output shaft, a cam holder keyed to said output shaft for rotation therewith, a driven gear having peripheral teeth in mesh with the teeth of said drive gear and rotatably mounted on said output shaft for rotation relative thereto, means for mounting said cam holder and said output shaft for rotation on said panel, said cam holder being engageable with said driven gear to rotate said output shaft and said cam holder when in clutched connection with said driven gear, second means to indicate the relative angular position of said output shaft, a tightening member connected to the front portion of said output shaft and engageable with said panel mounting means to place said cam holder in clutched connection with said driven gear when said tightening member is tightened, cam means mounted on said cam holder, and response means positioned adjacent said cam holder and engageable with said cam means.

4. In an adjustable cam programmer, apparatus comprising in combination, an input drive gear having teeth, an output shaft, a cam holder keyed to said output shaft, a driven gear having teeth in mesh with the teeth of said drive gear, said cam holder being mounted for rotation with said output shaft when in clutched connection with said driven gear, a tightening member connected to said output shaft and adapted to place said cam holder in clutched connection with said driven gear when said member is tightened and to disconnect said cam holder from said driven gear when said member is loosened, at least one cam carried by said cam holder, and cam follower response means mounted adjacent said cam holder and engageable with said cam.

5. The combination according to claim 4 wherein a panel member is provided, said cam holder is located on said output shaft behind said panel, said drive and said driven gears are rotatably mounted behind said panel member, and said tightening member is connected to said output shaft in front of said panel member.

6. The combination according to claim 5 wherein said output shaft is rotatably mounted in a bushing mounted on said panel member, said bushing extending through and rearwardly of said panel member, and said driven gear is rotatably mounted on said bushing for rotation relative to said output shaft when said driven gear is disengaged from said cam holder.

7. The combination according to claim 5 wherein said input driven gear is keyed for rotation with an input shaft rotatably mounted on said panel member, and indicating means are coupled to said input shaft and to said output shaft for indicating the angular displacement of said output shaft relative to said input shaft.

8. In an adjustable cam programmer, apparatus comprising, in combination, a panel, an input shaft, a bushing mounted on said panel, said shaft extending through said bushing and panel, a drive gear having peripheral teeth and keyed to said shaft behind said panel, a dial fixed to the front of said panel surrounding said shaft, a knob secured to said shaft in front of said panel, said knob having an index mark to indicate the angular position of said shaft relative to said dial, a plurality of output shafts parallel to and surrounding said input shaft at equal distances therefrom and from each other respectively, a cam holder keyed to each of said output shafts behind said panel, a driven gear having peripheral teeth in mesh with the teeth of said drive gear, a bushing for each of said output shafts mounted on said panel, said output shaft extending through their bushings and said panel respectively, each cam holder being mounted for rotation with its said output shaft when in clutched connection with its respective driven gear, a dial fixed to the front of said panel surrounding each output shaft, a knob secured to each output shaft in front of said panel and having an index mark to indicate the angular position of its shaft relative to its dial, a tightening member connected to the front portion of each output shaft and adapted to place said cam holder in clutched connection with its respective driven gear when said respective tightening member is tightened and vice versa, a clutch facing positioned between each said cam holder and its respective driven gear, respectively adjoining driven gears having partial peripheral teeth on opposite sides of the median plane between respective faces of each said driven gear to avoid interference in the course of the turning of all of them simultaneously by said drive gear to turn their respective output shafts, and an angularly adjustable cam mounted on each cam holder adapted to cooperate respectively with at least one microswitch, whereby the turning of said input shaft may be used to turn said respective cams for actuation of said switches in a predetermined control program.

9. In an adjustable cam programmer, apparatus comprising, in combination, an input shaft, a drive gear having peripheral teeth and keyed to said shaft, means to indicate the relative angular position of said shaft, a plurality of output shafts parallel to and surrounding said input shaft, a cam holder fixed to each of said output shafts, a driven gear having peripheral teeth in mesh with the teeth of said drive gear, each cam holder being mounted for rotation with its said output shaft when in clutched connection with its respective driven gear, means to indicate the relative angular position of each output shaft, a tightening member connected to the front portion of each output shaft and adapted to place said cam holder in clutched connection with its respective driven gear when said respective tightening member is tightened and vice versa, respectively adjoining driven gears having partial peripheral teeth on opposite sides of the median plane between respective faces of each said driven gear to avoid interference in the course of the turning of all of them simultaneously by said drive gear to turn their respective output shafts, and an angularly adjustable cam mounted on each cam holder adapted to cooperate respectively with at least one program response element 10. In an adjustable cam programmer, apparatus comprising, in combination, an input portion of said programmer having a drive gear with teeth, a plurality of output shafts, a cam holder fixed to each of said output shafts, a driven gear having teeth in mesh with the teeth of said drive gear, each cam holder being mounted for rotation with said output shaft when in clutched connection with its respective driven gear, a tightening member connected to the front portion of each output shaft and adapted to tighten said cam holder to place it in clutched connection against its respective driven gear and, when loosened, to disconnect said cam holder from its respective said driven gear, respectively adjoining driven gears having partial peripheral teeth on opposite sides of the median plane between respective faces of each said driven gear to avoid interference in the course of the turning of all of them simultaneously by said drive gear to turn their respective output shafts when the respective tightening members are tightened, and at least one angularly adjustable cam mounted on each cam holder.

11. An adjustable cam programmer as set forth in claim 10, comprising, at least one said cam holder having a cylindrical cam carrying surface, at least said cam for said cam holder being a cam ring adapted to slidably fit over said surface, means for adjustably positioning said cam ring in a selected angular orientation relative to said cam holder, a microswitch having a cam roller to roll on the camming periphery of said cam ring, and further means for selectively adjusting the angular position of said cam holder and cam ring relative to said driven gear when said tightening member is loosened.

12. In an adjustable cam programmer, apparatus comprising, in combination, an input portion of said programmer having a drive gear with teeth, a plurality of output shafts, a cam holder fixed to each of said output shafts, a driven gear for each said cam holders and having teeth in mesh with the teeth of said drive gear, means for operatively connecting and disconnecting each of said cam holders with its output shaft relative to its respective driven gear, respectively adjoining driven gears having partial peripheral teeth on opposite sides of the median plane between respective faces of each of said driven gears to avoid interference in the course of the turning of all of them simultaneously by said drive gear to turn their respective output shafts when their respective connecting means are connected, and at least one cam mounted on each cam holder.

References Cited by the Examiner

UNITED STATES PATENTS

| 1,194,713 | 8/1916 | Churchward | 64—30 |
| 1,203,653 | 11/1916 | Roever | 64—30 |
| 1,418,379 | 6/1922 | Karle | 85—8.8 |
| 2,177,760 | 10/1939 | Wheat | 74—10.8 |
| 2,861,469 | 11/1958 | Kintzing | 74—568 |
| 2,921,150 | 1/1960 | Wotring | 200—153 |
| 3,136,966 | 6/1964 | Lindeman et al. | 74—10.31 |
| 3,187,600 | 6/1965 | Seybold | 74—435 |

MILTON KAUFMAN, *Primary Examiner.*

BROUGHTON G. DURHAM, *Examiner.*

W. S. RATLIFF, *Assistant Examiner.*